United States Patent
Yoshino

(10) Patent No.: US 8,122,928 B2
(45) Date of Patent: Feb. 28, 2012

(54) PNEUMATIC TIRE

(75) Inventor: Jun Yoshino, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 740 days.

(21) Appl. No.: 12/158,892

(22) PCT Filed: Dec. 21, 2006

(86) PCT No.: PCT/JP2006/325545
§ 371 (c)(1),
(2), (4) Date: Sep. 18, 2008

(87) PCT Pub. No.: WO2007/072924
PCT Pub. Date: Jun. 28, 2007

(65) Prior Publication Data
US 2009/0229725 A1    Sep. 17, 2009

(30) Foreign Application Priority Data
Dec. 21, 2005  (JP) ................. P2005-368645

(51) Int. Cl.
*B60C 3/00*  (2006.01)
*B60C 15/00* (2006.01)
*B60C 15/06* (2006.01)

(52) U.S. Cl. ........ 152/539; 152/454; 152/455; 152/456; 152/541

(58) Field of Classification Search ................ 152/455, 152/548, 456, 454, 539, 541
See application file for complete search history.

(56) References Cited

U.S. PATENT DOCUMENTS

| | | | |
|---|---|---|---|
| 5,909,757 A * | 6/1999 | Kakumu et al. | .......... 152/543 |
| 6,026,878 A | 2/2000 | Zhang et al. | |
| 6,883,568 B2 | 4/2005 | Muhlhoff | |
| 2004/0226642 A1 | 11/2004 | Muhlhoff | |

FOREIGN PATENT DOCUMENTS

| | | | |
|---|---|---|---|
| CN | 1264343 A | | 8/2000 |
| CN | 1535215 A | | 10/2004 |
| EP | 1184205 A2 | * | 3/2002 |
| JP | 61-261108 | * | 11/1986 |

(Continued)

OTHER PUBLICATIONS

Chinese Office Action dated May 15, 2009 (with English Translation) (10 pages).

*Primary Examiner* — Justin Fischer
(74) *Attorney, Agent, or Firm* — Sughrue Mion, PLLC

(57) ABSTRACT

A pneumatic tire according to the present invention includes bead units and a carcass layer at least. The bead units includes an inside bead core and an inside bead filler located in an inside under an equipment on a vehicle, and an outside bead core and an outside bead filler located in an outside. The carcass layer includes a main body and turnbacks. The main body extends from the inside bead core to the outside bead core. Each of the turnbacks is turned back from the inside bead core or the outside bead core to an internal side of a belt layer. Here, each edge of the turnbacks provided at a tire inner peripheral side of the belt layer is located inside from each edge of the belt layer in a tread width direction. In addition, a height of the outside bead filler is lower than a height of the inside bead filler in a cross section along the tread width direction.

3 Claims, 3 Drawing Sheets

FOREIGN PATENT DOCUMENTS

| | | |
|---|---|---|
| JP | 62-004609 A | 1/1987 |
| JP | 64-060406 A | 3/1989 |
| JP | 06-127216 A | 5/1994 |
| JP | 2652855 B2 | 5/1997 |
| JP | 11-334312 A | 12/1999 |
| JP | 2002-002216 A | 1/2002 |
| JP | 2002-192922 A | 7/2002 |
| JP | 2004-535327 A | 11/2004 |

* cited by examiner

PNEUMATIC TIRE

CROSS REFERENCE TO RELATED APPLICATIONS

This application is a National Stage of International Application No. PCT/JP2006/325545 filed on Dec. 21, 2006, claiming priority based on Japanese Patent Application No. 2005-368645, filed on Dec. 21, 2005, the contents of all of which are incorporated herein by reference in their entirety.

TECHNICAL FIELD

The present inventions relate to a pneumatic tire, especially, a pneumatic tire capable of improving driveability-and-stability and ride-comfort.

BACKGROUND ART

Heretofore, various approaches have been made in respect to a pneumatic tire to improve driveability-and-stability and ride-comfort. For example, a pneumatic tire, which improves driveability-and-stability by making tire geometry (such as tread patterns and sidewalls) asymmetric to a tire equatorial plane, is disclosed (for example, see Patent Document 1). In addition, a pneumatic tire, which improves ride-comfort by making tire geometry symmetric to a tire equatorial plane, is disclosed (for example, see Patent Document 2)

Patent Document 1: Japanese Patent Application Laid-Open NO. Hei6-127216 (pages 2 to 4, FIG. 1)

Patent Document 2: Japanese Examined Patent Application Publication NO. Shou62-004609 (pages 2 to 3, FIG. 1)

DISCLOSURE OF THE INVENTION

If a tire size is relatively small (for example, a 55-series tire or smaller), a tire height (i.e., sectional height) is small and an aspect ratio is small. Therefore, the pneumatic tire disclosed in the Patent Document 1 provides fewer improvements in driveability-and-stability, especially straight-line stability, than a relatively large-sized pneumatic tire (for example, a 60-series tire or larger) because tire geometry based on a tire equatorial plane provides little difference (in symmetry-based difference).

As explained above, if a tire size is relatively small, a tire height is small and also an aspect ratio is small. Therefore, the pneumatic tire disclosed in the Patent Document 2 provides worse ride-comfort than a relatively large-sized pneumatic tire although driveability-and-stability can be improved due to high tire stiffness.

In this manner, there is a trade-off problem between drive-ability-and-stability and ride-comfort so that a technical solution capable of satisfying both of them has been desired.

Therefore, it is an object of the present inventions to provide a pneumatic tire that can improve driveability-and-stability and ride-comfort regardless of a tire size.

A pneumatic tire according to the present invention includes bead units and a carcass layer at least. The bead units includes an inside bead core and an inside bead filler located in an inside under an equipment on a vehicle, and an outside bead core and an outside bead filler located in an outside under the equipment on the vehicle. The carcass layer includes a main body and turnbacks. The main body extends from the inside bead core to the outside bead core. Each of the turnbacks is turned back from the inside bead core or the outside bead core to an internal side of a belt layer. Here, each edge of the turnbacks provided at a tire inner peripheral side of the belt layer is located inside from each edge of the belt layer in a tread width direction. In addition, a height of the outside bead filler is lower than a height of the inside bead filler in a cross section along the tread width direction.

According to this, since the edge of the turnback is located inside from the edge of the belt layer in the tread width direction and also the height of the outride bead filler is lower than the height of the inside bead filler, the tire geometry at the inside and the outside under an equipment on a vehicle is kept optimal regardless of a tire size. Therefore, driveability-and-stability can be improved.

In addition, since the height of the outside bead filler is lower than the height of the inside bead filler, sidewall stiffness of the inside and the outside under equipment on a vehicle is kept optimal even if a tire size is small. Therefore, ride-comfort can be improved.

Here, it is preferable that cubic volume of the outside bead filler is less than cubic volume of the inside bead filler. According to this, since the stiffness of the inside bead is made higher than the stiffness of the outside bead, a tread contact pressure is made constant in case where a tire is equipped with a negative camber angle. Therefore, driveability-and-stability can be improved.

Here, it is preferable that each thickness of the inside bead filler and the outside bead filler is made gradually thinner from a tire inner peripheral side toward a tire outer peripheral side in the cross section along the tread width direction. According to this, since the bead stiffness is gradually reduced from the tire inner peripheral side toward the tire outer peripheral side, the bead stiffness can be assured and deformation of the sidewalls can be optimized. As a result, the tread contact pressure is made constant in case where a tire is equipped with a negative camber angle, and thereby drive-ability-and-stability can be improved. And ride-comfort can be improved due to the optimal deformation of the sidewalls.

Here, it is preferable that each overlapped width between the turnbacks and the belt layer in the cross section along the tread width direction is equal-to or less-than 40 mm, If the overlapped width is more than 40 mm, the turnbacks of the carcass layer causes variability at tire molding and thereby circularity becomes worse. Therefore, it may become impossible to improve ride-comfort and noise-and-vibration performance.

Here, it is preferable that the height of the outside bead filler is equal-to or less-than an 80% height of the inside bead filler in the cross section along the tread width direction.

If the height of the outside bead filler is more than the 80% height of the inside bead filler, it may be impossible to keep the tire geometry at the inside and the outside optimal under an equipment on a vehicle, Therefore, it may become impossible to improve driveability-and-stability.

Here, it is preferable that the bead units further includes an inside bead toe and an outside bead toe, and the height of the inside bead filler is set within 20 to 50% of a tire height in the cross section along the tread width direction. The tire height is a distance from a bead line connecting between the inside bead toe and the outside bead toe to a most outward peripheral position on the tread.

If the height of the inside bead filler is less than 20% of the tire height, the sidewall stiffness is reduced. Therefore, it may be impossible to assure driveability-and-stability and durability. On the other hand, if the height of the inside bead filler is more than 50% of the tire height, the sidewall stiffness becomes excessively high. Therefore, it may be impossible to improve ride-comfort and noise-and-vibration performance.

Here, it is preferable that an outside maximum width from a tire central line passing a center of the bead line is wider than an inside maximum width in the cross section along the tread width direction.

Here, it is preferable that a height position providing the outside maximum width is higher from the bead line than a height position providing the inside maximum width.

Here, it is preferable that a first inner average radius of an internal outline in the tire outer peripheral side from a position providing the inside maximum width, is larger than a second inner average radius of an internal outline in the tire inner peripheral side from the position providing the inside maximum width.

Here, it is preferable that a first outer average radius of an internal outline in the tire outer peripheral side from a position providing the outside maximum width, is smaller than a second outer average radius of an internal outline in the tire inner peripheral side from a position providing the outside maximum width.

Here, it is preferable that the first inner average radius of the internal outline in the tire outer peripheral side from the position providing the inside maximum width, is larger than the first outer average radius of the internal outline in the tire outer peripheral side from the position providing the outside maximum width.

Here, a pneumatic tire according to the present invention is measured under a condition in which it is equipped onto a standard rim with a standard air pressure.

Note that the "standard rim" is a rim regulated in a JATMA (Japan Automobile Tire Manufacturers' Association, Inc.) Year Book 2004. In addition, the "standard air pressure" is an air pressure corresponding to a maximum load capacity in the JATMA (Japan Automobile Tire Manufacturers' Association, Inc.) Year Book 2004.

Outside Japan, an inner pressure means an air pressure corresponding to a maximum load (maximum load capacity) for a single wheel described in after-mentioned regulations. In addition, a rim means a standard rim (or "Apprroved rim", "Recommended Rim") with an applied size described in the after-mentioned regulations.

The regulations are established according to industrial regulations effective to regions where a tire is produced or used. For example, in the United States of America, the regulation is established as a "Year Book of The Tire and Rim Association Inc." In Europe, the regulation is established as a "Standards Manual of The European Tire and Rim Technical Organization".

BRIEF DESCRIPTION OF THE DRAWINGS

FIG. 1 is a cross sectional diagram (enlarged cross sectional diagram) along a tread width direction showing a pneumatic tire according to a present embodiment.

FIG. 1 is a cross sectional diagram (simplified cross sectional diagram) along the tread width direction showing the pneumatic tire according to the present embodiment.

FIG. 3 is an explanatory diagram showing a contact state between a road surface and the pneumatic tire according to the present embodiment.

BEST MODE(S) FOR CARRYING OUT THE INVENTION

Next, one example of a pneumatic tire according to the present invention will be explained with reference to drawings. Note that, in respect to descriptions on the drawings, each equivalent or corresponding configuration is allocated to an equivalent or corresponding numeral. However, the drawings are shown in outline, and thereby each actual proportion of dimension or the like may be different. Therefore, each concrete dimension or the like should be determined with considering explanations below. In addition, each relation or proportion of dimension may be different between the drawings.

(Configuration of Pneumatic Tire)

Figure 1:
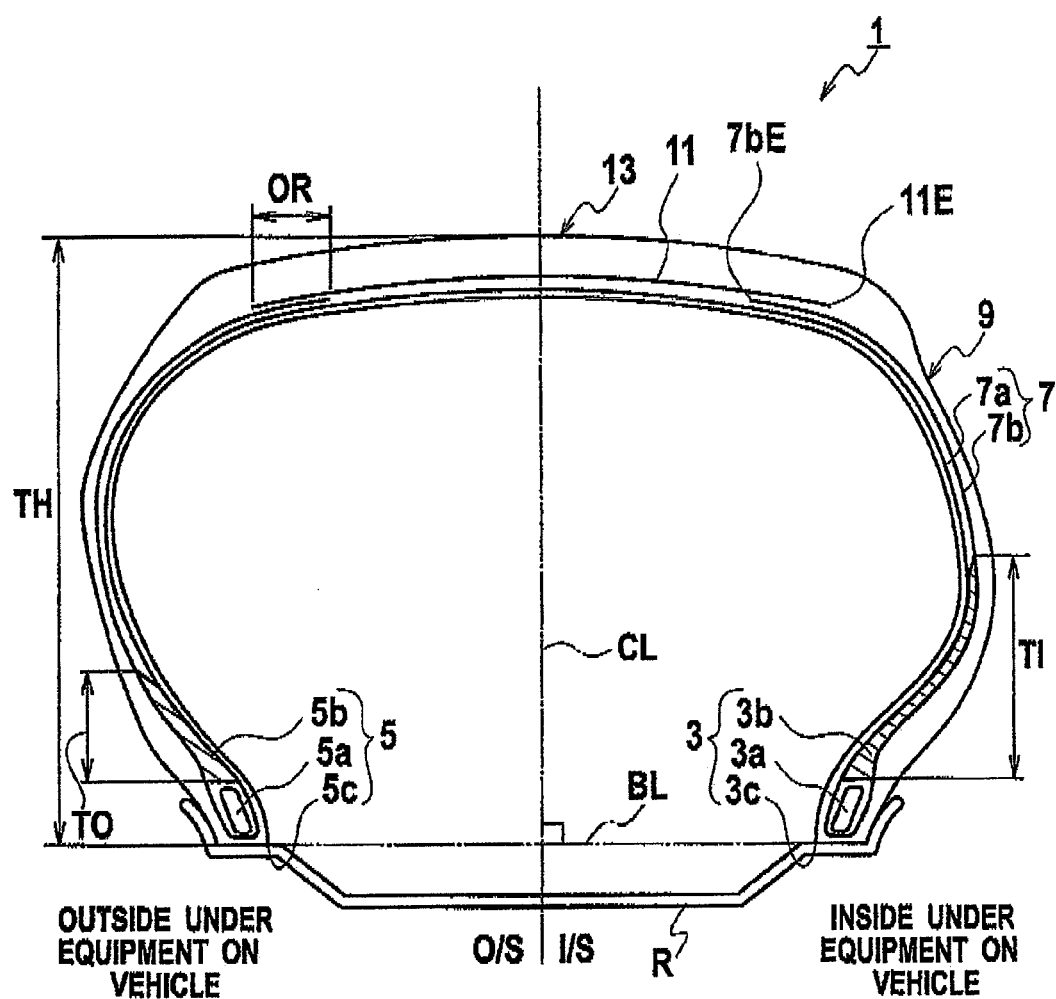
[FIG. 1]

FIG. 1 is a cross sectional diagram along a tread width direction showing a pneumatic tire according to a present embodiment. As shown in FIG. 1, the pneumatic tire 1 includes a bead unit 3 which is located at an inside under equipment on a vehicle. The bead unit 3 includes an inside bead core 3a, an inside bead filler 3b and an inside bead toe 3c. In addition, the pneumatic tire 1 includes a bead unit 5 which is located at an outside under equipment on a vehicle. The bead unit 5 includes an outside bead core 5a, an outside bead filler 5b and an outside bead toe 5c.

In addition, the pneumatic tire 1 includes a carcass layer 7 (so-called a carcass layer with an envelope structure) having a main body 7a and turnbacks 7b. The main body 7a extends from the inside bead core 3a to the outside bead core 5a. Each of the turnbacks 7b is turned back from the inside bead core 3a or the outside bead core 5a to an internal side of a belt layer 11 via each sidewall 9.

Note that the belt layer 11 is provided at a tire outer peripheral side of the carcass layer 7. A tread 13 is provided at a tire outer peripheral side of the belt layer 11, which contacts with a road surface.

Here, each edge 7bE of the turnbacks, which is each edge of the carcass layer 7, is located at a tire inner peripheral side of the belt layer 11. Bach edge 7bE of the turnbacks is located inside from each edge 11E of the belt layer 11 in the tread width direction.

Specifically, it is preferable that each overlapped width (OR) between the turnbacks 7b and the belt layer 11 is equal-to or less-than 40 mm. Note that, if the overlapped width (OR) is more than 40 mm, the turnbacks 7b of the carcass layer 7 may cause variability at tire molding. As a result, circularity becomes worse and then it may become impossible to improve road- and noise-and-vibration performance sufficiently.

A height (TO) of the outside bead filler 5b is lower than a height (TI) of the inside bead filler 3b. In addition, cubic volume of the outside bead filler 5b is less than cubic volume of the inside bead filler 3b. Further, each thickness of the inside bead filler 3b and the outside bead filler 5b is made gradually thinner from a tire inner peripheral side toward a tire outer peripheral side.

It is preferable that the height (TO) of the outside bead filler 5b is equal-to or less-than 80% of the height (TI) of the inside bead filler 3b. If the height (TO) of the outside bead filler 5b is more than 80% of the height (TI) of the inside bead filler 3b, it may be impossible to keep a tire geometry at the inside and the outside optimal under an equipment on a vehicle. Therefore, it may become impossible to improve driveability-and-stability. As a result, it may become impossible to improve driveability-and-stability sufficiently.

In addition, it is preferable that the height (TI) of the inside bead filler 3b is set within 20 to 50% of a tire height (TH), which is a distance from a bead line BL (a line connecting between the inside bead toe 3c and the outside bead toe 5c) to a most outward peripheral position on the tread 13.

If the height (TI) of the inside bead filler 3b is less than 20% of the tire height (TH), stiffness of the sidewall 9 may be reduced. As a result, it may be impossible to assure driveability-and-stability and durability. On the other hand, if the height (TI) of the Inside bead filler 3b is more than 50% of the tire height (TH), the stiffness of the sidewall 9 may become excessively high. As a result, it may be impossible to improve ride-comfort and noise-and-vibration performance sufficiently.

(Geometry of Pneumatic Tire)

Figure 2:
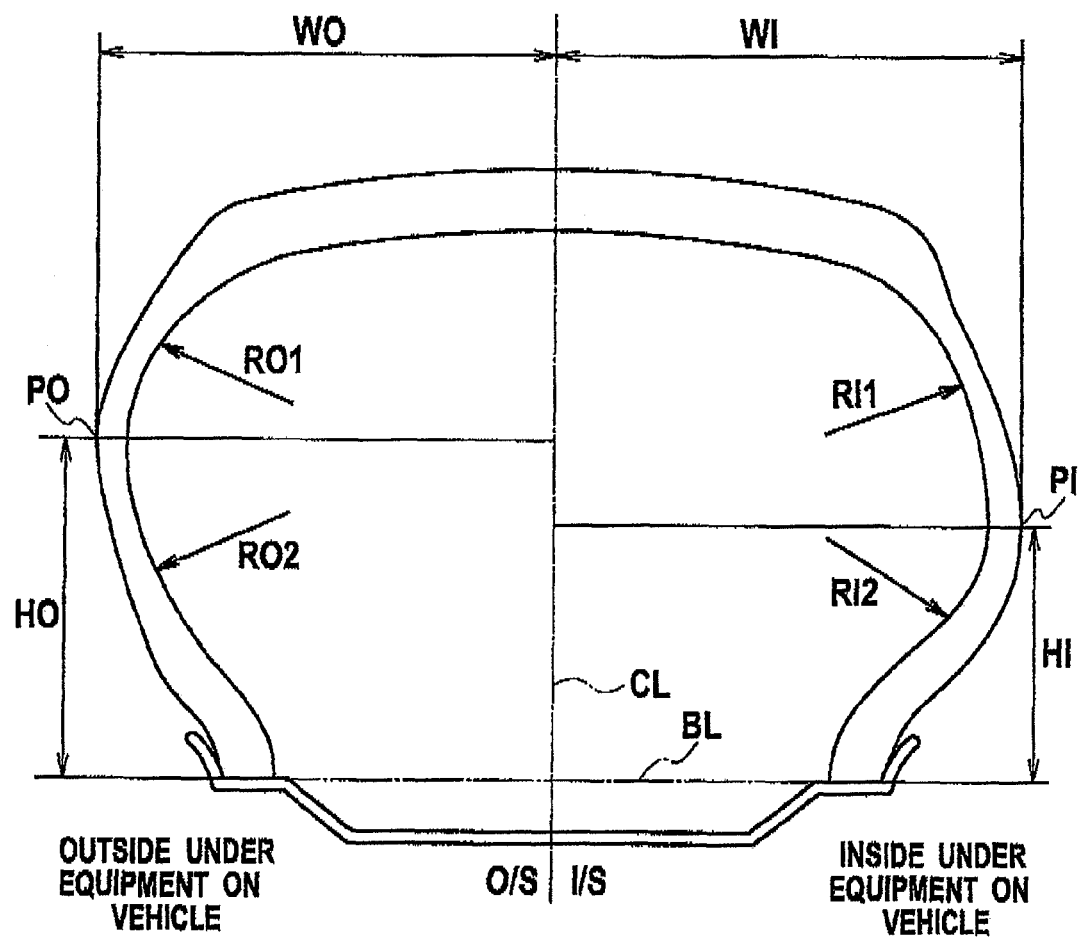
[FIG. 2]

Next, geometry of the above-mentioned pneumatic tire 1 will be explained with reference to FIG. 2. FIG. 2 is a cross sectional diagram (simplified cross sectional diagram) along the tread width direction showing the pneumatic tire according to the present embodiment.

A shown in FIG. 2, an outside maximum width (WO) from a tire central line (a tire equator plane) CL is wider than an inside maximum width (WI) under an equipment on a vehicle. Note that the tire central line CL is a line that is perpendicular to the above-mentioned bead line BL and passes the center of the bead line BL.

In addition, an outside maximum height (HO), which is a height of a position PO providing the outside maximum width from the bead line BL, is higher than an inside maximum height (HI), which is a height of a position PI providing the inside maximum width.

In addition, a first inner average radius (RI1) of an internal outline in the tire outer peripheral side from the position PI, is larger than a second inner average radius (RI2) of an internal outline in the tire inner peripheral side. In addition, a first outer average radius (RO1) of an internal outline in the tire outer peripheral side from the position PO, is smaller than a second outer average radius (RO2) of an internal outline in the tire inner peripheral side. Further, the first inner average radius (RI1) is larger than the first outer average radius (RO1).

(Workings and Advantages)

According to the above-mentioned pneumatic tire 1 of the present embodiment, the tire geometry and the stiffness of the sidewalls 9 at the inside and the outside under equipment on a vehicle are kept optimal even if a tire size is small. Therefore, driveability-and-stability and ride-comfort can be improved.

By the away, the pneumatic tire 1 is often equipped on a vehicle with providing a camber angle to improve driveability-and-stability, recently. Almost one-degree negative camber angle is often set to improve driveability-and-stability, especially to raise needed cornering force raster at turning.

Figure 3:
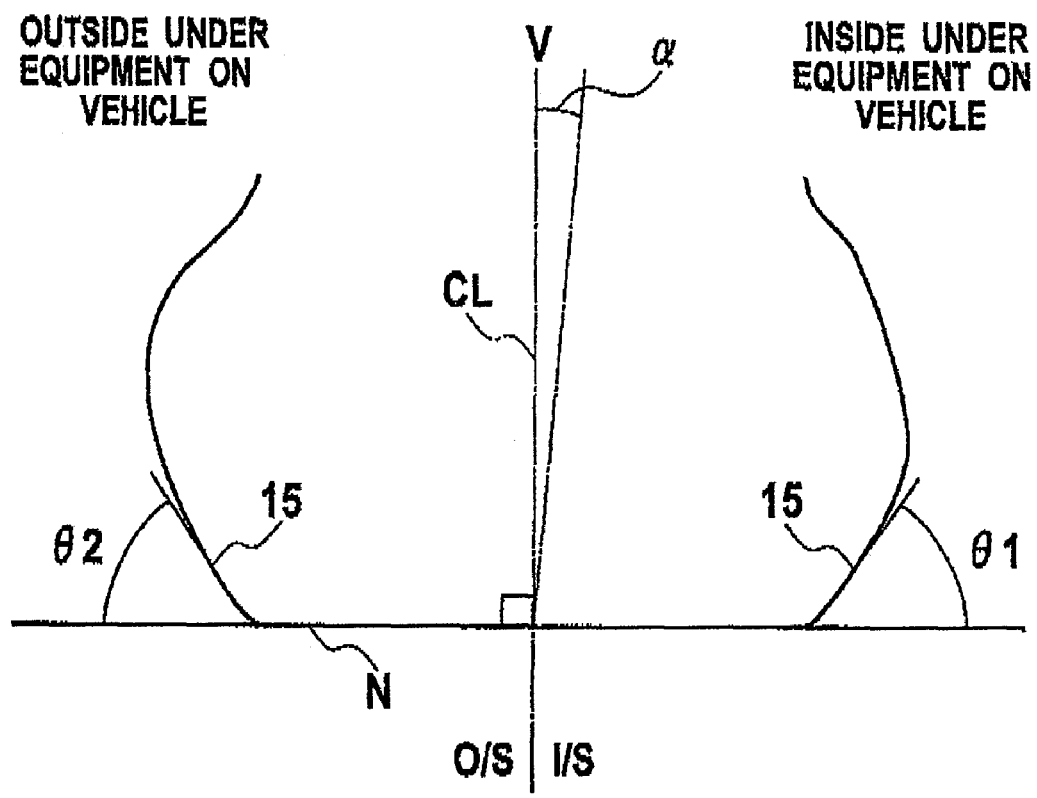
[FIG. 3]

FIG. 3 is a cross sectional view along the tread width direction with negative camber angle α is set. As shown in FIG. 3, according to the pneumatic tire 1 of the present embodiment, a minimum angle (herein after, a minimum contact angle) θ1 between a tread contact plane N and an inside buttress 15 can be set to almost equal to an outer minimum contact angle θ2.

Therefore, an outspreading shape of a contact patch at turning can be made almost identical between a left turn and a right turn. As a result, side forces at a left turn and a right turn, which are generated on the entire of the contact patch, can be made almost identical. Therefore, a cornering force can be raised faster at a left turn and a right turn, and thereby driveability-and-stability can be improved.

In addition, a balance between the inside and outside contact patches can be kept almost equal by setting the inside minimum contact angle θ1 and the outside minimum contact angle θ2 almost equal at a straight run, even if disturbances from a road surface (i.e., run over bumps) have been input under the negative camber angle α being set. As a result, straight-line stability and ride-comfort can be also improved.

As explained above, according to the pneumatic tire 1 of the present embodiment, driveability-and-stability and ride-comfort can be improved regardless of a tire size. Concurrently, straight-line stability and noise-and-vibration performance can be also improved.

Another Embodiment

As explained above, although contents of the present invention have been disclosed through the embodiments of the present invention, the present invention is not limited to the descriptions and the drawings in the above disclosure.

Specifically, when the pneumatic tire 1 of the present embodiment is equipped on a vehicle with a positive camber angle, driveability-and-stability and ride-comfort can be improved by setting the inside and the outside reversely against the above-mentioned case.

Based on the disclosure, various alternative embodiments, modes of the invention and operable technologies may be obvious to the person having ordinary skill in the art. Therefore, a technical scope of the present invention is defined only by a subject matter sought to be patented in claims appropriately derived from the above explanation.

Next, a result of a test done with after-mentioned pneumatic tires will be explained to clarify advantages by the present invention. Note that data in respect to each pf the pneumatic tires are measured under a condition shown below.

| Tire Size: | 225/55R17 |
| Wheel size: | 17 × 7JJ |
| Inner Pressure: | 230 kPa |
| Loading Condition: | two occupants on vehicle |
| Vehicle Type: | FF-layout Car (2994 cc) |

Each configuration and performance (straight line stability, ride-comfort, and noise-and-vibration) of the pneumatic tires will be explained with reference to Table 1. Note that configurations except bead fillers are identical among a comparative sample(s) and an inventive sample(s).

TABLE 1

| | Sample 1 | Sample 2 | Sample 3 | Sample 4 |
|---|---|---|---|---|
| Height of outside bead filler (TO)/Tire height (TH) | 40% | 30% | 40% | 30% |
| Height of inside bead filler (TI)/Tire height (TH) | 40% | 30% | 30% | 40% |
| Height of outside bead filler (TO)/Height of inside bead filler (TI) | 100% | 100% | 133% | 75% |
| Straight-Line Stability | B | C | C | A |
| Ride-comfort | C | A | B | A |
| Noise-and-Vibration Performance | C | A | B | A |

As shown in Table 1, in the pneumatic tire of Sample 1, the height of the outside bead filler (TO) is "40%" of the tire height (TH), and the height of the inside bead filler (TI) is "40%" of the tire height (TH). In other words, the height of the outside bead filler (TO) and the height of the inside bead filler (TI) is equal.

In the pneumatic tire of Sample 2, the height of the outside bead filler (TO) is "30%" of the tire height (TH), and the height of the inside bead filler (TI) is "30%" of the tire height (TH). In other words, the height of the outside bead filler (TO) and the height of the inside bead filler (TI) is equal.

In the pneumatic tire of Sample 2, the height of the outside bead filler (TO) is "40%" of the tire height (TH), and the height of the inside bead filler (TI) is "30%" of the tire height (TH). In other words, the height of the outside bead filler (TO) is higher than the height of the inside bead filler (TI).

In the pneumatic tire of Sample 2, the height of the outside bead filler (TO) is "30%" of the tire height (TH), and the height of the inside bead filler (TI) is "40%" of the tire height (TH). In other words, the height of the outside bead filler (TO) is lower than the height of the inside bead filler (TI).

<Straight Line Stability> Feeling evaluations on straight-line stability were carried out with a vehicle equipped with each of the pneumatic tires by a professional driver in a test course. Note that straight-line stability is superior in the order "A"-"B"-"C". As a result, it was found that the pneumatic tire of Sample 4 is superior to the pneumatic tires of Samples 1 to 3 in respect to straight-line stability as shown in Table 1.

<Ride-Comfort> Feeling evaluations on ride-comfort were carried out with a vehicle equipped with each of the pneumatic tires by a professional driver in a test course. Note that ride-comfort is superior in the order "A"-"B"-"C". As a result, it was found that the pneumatic tire of Sample 4 is superior to the pneumatic tires of Samples 1 and 3 in respect to ride-comfort as shown in Table 1.

<Noise-and-Vibration Performance> Feeling evaluations on noise-and-vibration performance were carried out with a vehicle equipped with each of the pneumatic tires by a professional driver in a test course. Note that noise-and-vibration performance is superior in the order "A"-"B"-"C". As a result, it was found that the pneumatic tire of Sample 4 is superior to the pneumatic tires of Samples 1 and 3 in respect to noise-and-vibration performance as shown in Table 1.

In this manner, it was found that the pneumatic tire of Sample 4 is superior to the pneumatic tires of Samples 1 to 3 in respect to straight line stability, ride-comfort and noise-and-vibration performance.

INDUSTRIAL APPLICABILITY

In the present invention, each edge of the turnbacks is located inside from each edge of the belt layer in the tread width direction, and the height of the outside bead filler is lower than the height of the inside bead filler. By these configurations, driveability-and-stability and ride-comfort can be improved according to the present invention.

The invention claimed is:

1. A pneumatic tire comprising:
bead units which include an inside bead core and an inside bead filler located in an inside under an equipment on a vehicle, and an outside bead core and an outside bead filler located in an outside under the equipment on the vehicle; and
a carcass layer which includes a main body extending from the inside bead core to the outside bead core and turnbacks each of which is turned back from the inside bead core or the outside bead core to an internal side of a belt layer,
wherein:
each edge of the turnbacks provided at a tire inner peripheral side of the belt layer is located inside from each edge of the belt layer in a tread width direction,
a height of the outside bead filler is lower than a height of the inside bead filler in a cross section along the tread width direction,
the bead units further includes an inside bead toe and an outside bead toe,
the height of the inside bead filler is set within 20 to 50% of a tire height in the cross section along the tread width direction, the tire height being a distance from a bead line connecting between the inside bead toe and the outside bead toe to a most outward peripheral position on the tread,
an outside maximum width from a tire central line passing a center of the bead line is wider than an inside maximum width in the cross section along the tread width direction
a height position providing the outside maximum width is higher from the bead line than a height position providing the inside maximum width, and
a first inner average radius of an internal outline in the tire outer peripheral side from a position providing the inside maximum width, is larger than a second inner average radius of an internal outline in the tire inner peripheral side from the position providing the inside maximum width.

2. The pneumatic tire according to claim 1, wherein
a first outer average radius of an internal outline in the tire outer peripheral side from a position providing the outside maximum width, is smaller than a second outer average radius of an internal outline in the tire inner peripheral side from the position providing the outside maximum width.

3. The pneumatic tire according to claim 2, wherein
the first inner average radius of the internal outline in the tire outer peripheral side from the position providing the inside maximum width, is larger than the first outer average radius of the internal outline in the tire outer peripheral side from the position providing the outside maximum width.

* * * * *